United States Patent [19]

Eberle

[11] 3,954,216

[45] May 4, 1976

[54] APPARATUS FOR THERMAL RELAY WELDING

[75] Inventor: William J. Eberle, Reading, Pa.

[73] Assignee: General Battery Corporation, Reading, Pa.

[22] Filed: Jan. 11, 1974

[21] Appl. No.: 432,545

Related U.S. Application Data

[60] Continuation-in-part of Ser. No. 395,528, Sept. 10, 1973, Pat. No. 3,861,575, which is a division of Ser. No. 184,338, Sept. 28, 1971, abandoned.

[52] U.S. Cl............................. 228/51; 164/DIG. 1; 228/58; 228/196
[51] Int. Cl.².......................................... B23K 3/02
[58] Field of Search............... 164/DIG. 1, 332–334; 228/25, 51, 58, 196; 29/2; 136/175, 176

[56] References Cited
UNITED STATES PATENTS

| | | | |
|---|---|---|---|
| 3,259,525 | 7/1966 | Wilson............................ | 164/DIG. 1 |
| 3,493,035 | 2/1970 | Tiegel............................. | 228/58 X |
| 3,589,948 | 6/1971 | Adams............................ | 136/176 X |
| 3,591,755 | 7/1971 | Cushman......................... | 164/80 X |
| 3,806,696 | 4/1974 | Young............................. | 136/176 X |

OTHER PUBLICATIONS

Cushman, R. N., *Bell System Technical Journal*, "Techniques for Bonding the Positive Plates," Vol. 49, No. 7, pp. 1423–1429, Sept. 1970.

*Primary Examiner*—Al Lawrence Smith
*Assistant Examiner*—Nicholas P. Godici

[57] ABSTRACT

Members are welded together by indirect application of heat, as for welding internal battery posts for connecting groups of plates or terminal posts electrically, through the use of a plurality of heated elements simultaneously engaging posts to be welded together, and wherein the configuration of molten material is controlled as the weld cools, by the use of a templet. The elements are heated, preferably by application of open flame through a plurality of mixing systems for the fuel, with one system being provided for each heated element.

15 Claims, 16 Drawing Figures

APPARATUS FOR THERMAL RELAY WELDING

REFERENCE TO RELATED APPLICATIONS

This is a continuation in part of U.S. patent application Ser. No. 395,528 filed Sept. 10, 1973, now U.S. Pat. No. 3,861,575 which in turn is a divisional application of U.S. patent application Ser. No. 184,338 filed Sept. 28, 1971, now abandoned, and thus insofar as the subject matter is concerned this application in part is a continuation of the U.S. parent application Ser. No. 184,338.

BACKGROUND OF THE INVENTION

This invention relates to welding in general, and specifically for welding posts of batteries, as for example of the type used in automobiles.

In the welding of various members together, it is commonplace to use a welding rod having a flux therein, for many types of welding, such as arc welding. In other instances, particularly when the materials being welded together are soft, such as those comprising pot metal, lead, lead alloys or like materials, welding may be effected by application of open flame to members that are to be welded together. In many instances such techniques are highly desired and quite meritorious.

However, in some instances, as for example when electrical conductivity is desired, it becomes paramount that the connection between members being welded be such as to create minimal electrical resistance.

In the art of battery manufacture, particularly well cell batteries for automobile usage and the like, it has become commonplace to utilize wet cell batteries, having a plurality of cells. In each cell, there are disposed a plurality of parallel but spaced plates, each having a lug extending therefrom, with the various lugs being interconnected by a battery strap, by any suitable means, such as that disclosed in U.S. Pat. No. 3,395,748. Extending from a strap of this type which connects plates of a given cell, is a post. Adjacent cells of a given battery are separated by cell partitions. Posts of groups of plates in adjacent cells must be connected, for electrical conductivity between cells. Accordingly, it is this connection of adjacent battery cell posts that is of primary concern in this application.

Because of the presence of a cell partition between the posts, the posts are somewhat spaced at their upper ends, in that the posts extend generally upwardly above the height of the cell partitions, such upward extension or protrusion facilitating the application of heat thereto, for obtaining an electrical connection between the posts across the upper end of an associated plate. Because of the necessity of obtaining good electrical conductivity across such post connections, the art of welding battery posts has become highly developed, with individuals for performing the same having developed a high degree of skill with respect thereto.

However, because such posts are generally spaced by the thickness of a cell partition, the flame achieved by the use of a gas-oxygen torch or the like must be raised to such a temperature that will permit the delivery of a sufficiently high temperature at the lower end of the spacing between adjacent posts, if it is desired to adhere the posts together as close as possible to the cell partition at the lower end of the spacing. However, in raising the welding temperature to such a level, excessive temperatures are reached at the uppermost ends of the posts, most closely located relative to the torch which accomplishes such "burning", such that early metal flow from the upper ends of the posts commences, such flow continuing down into the space between the posts, above the separator plate, and solidifying there, before lower ends of the posts in the vicinity of the upper end of the separator plate have become sufficiently heated, thereby resulting in an incomplete fusion of metal at a location corresponding to the upper edge of the cell partition. Thus, the result is that while a good fusion may exist at the upper ends of posts thus welded, often, at the lowermost ends of such posts, directly above the separator plate, the fusion is imperfect, with insufficient bond to provide sufficiently low electrical resistance as a connector. In order to avoid this, an operator may play the torch between the posts, in order to assure a good weld in the lower zone of such space above the separator plates or partitions, but such may cause the cell partitions to be scorched or damaged. Accordingly, the result is that present techniques of welding battery posts often results in variations or lack of uniformity in weldments of batteries, depending upon the particular operator or welder involved, as well as resulting in an undesirable percentage of rejects due to welds that have a sufficiently good external appearance to pass customary quality control, but which are really poor weldments. Furthermore, batteries having poor weldments of battery posts are more prone to cause operating difficulties.

SUMMARY OF THE INVENTION

The present invention is directed toward overcoming the above and other difficulties in connection with the welding of battery posts, as well as with welding in general by providing a novel method and apparatus whereby adjacent members, such as battery posts, and terminal posts may be indirectly welded by the use of a solid heat sink which penetrates the members to be welded, as it liquifies the same, thereby carrying the temperature of welding through the zone to be welded, in order to achieve uniformity in welds, as well as for other purposes.

Accordingly, it is a primary object of this invention to provide a novel method for welding together members that are to be welded, preferably by indirect application of heat thereto.

It is a further object of this invention to accomplish the above object, when the members are spaced apart, preferably in order to secure a good weld across a cell partition located between, but below the upper ends of the members that are to be welded together over the separator.

It is a further object of this invention to provide a novel method and apparatus for welding together battery posts.

It is another object of this invention to provide a novel welding mechanism, for delivering and mixing gases that are to be used in welding, and for applying the same to heat sink carried thereby.

It is a further object of this invention to accomplish the above object, wherein locating plates are utilized, in order to properly position a plurality of welding elements on the apparatus, in accordance with predetermined locations.

It is a further object of this invention to provide a novel method and apparatus for welding together battery posts, together with a means for molding the posts to desired configurations during solidification thereof after the welding has been effected.

Further objects of this invention reside in the construction of particularly novel welding apparatus more fully described hereinafter.

Other objects and advantages of the present invention, such as apparatus and method particularly directed toward the welding of battery posts, will be readily apparent, as will be objects of a generally broader nature, from a reading of the following brief descriptions of the drawing figures, detailed description of the preferred embodiment, and the appended claims.

DESCRIPTION OF THE PREFERRED EMBODIMENTS

Figure 1:
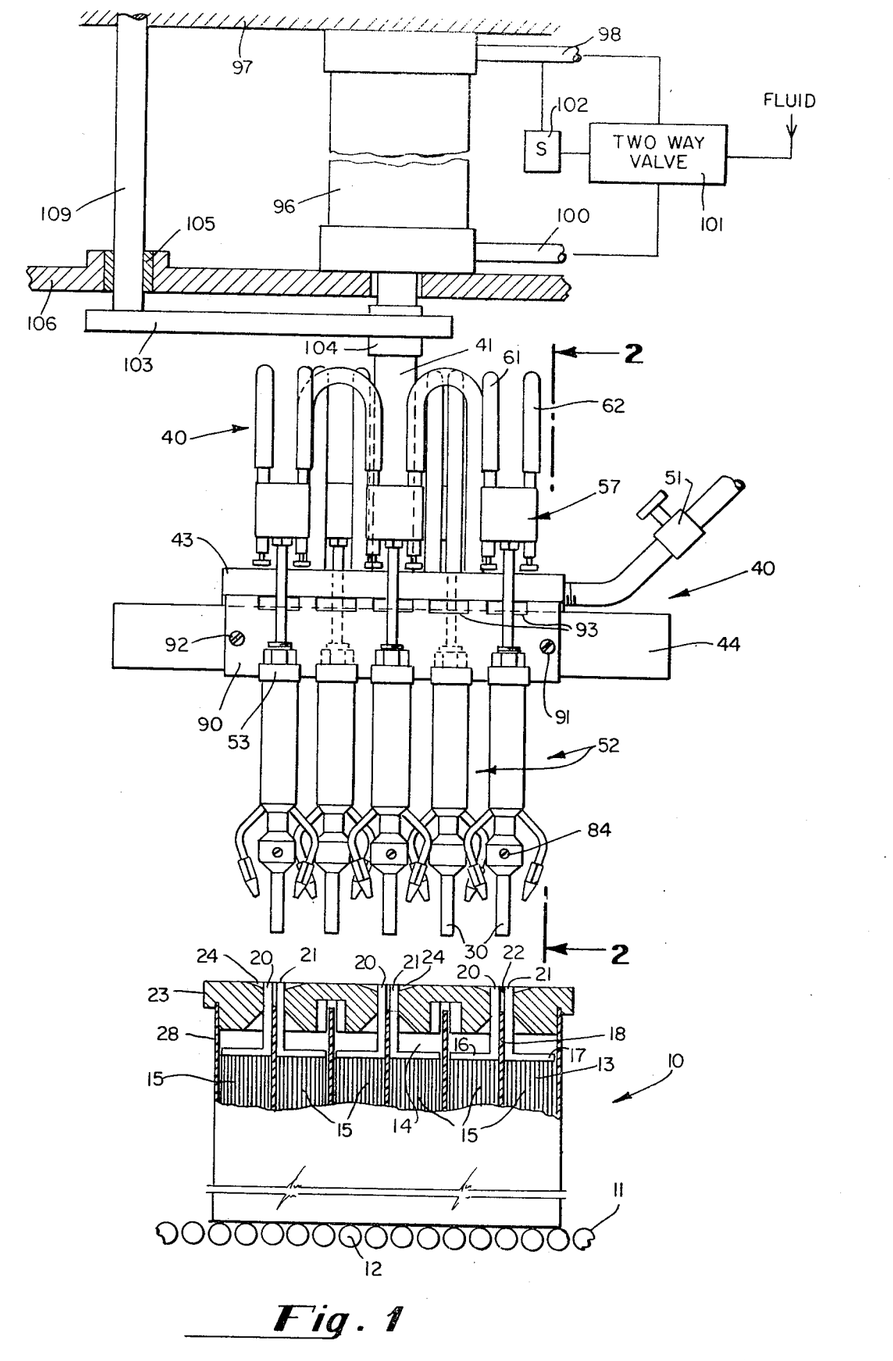
FIG. 1 is a side elevational view of an apparatus for welding battery posts, in accordance with this invention disposed above 2 battery that in itself is partially illustrated in section for clarity of illustration, with the battery being disposed on a conveyor.

Referring now to the drawings in detail, reference is first made to FIG. 1, and particularly to the lower end thereof, wherein there is illustrated a battery, generally designated by the numeral 10, disposed upon a conveyor 11, having a plurality of transverse rollers 12, for movement of the battery 10 from left to right, as viewed in FIG. 1, across the rollers 12.

A plurality of cells (six in number), such as those 13 and 14 are illustrated, in which are disposed a plurality of plates 15 extending downwardly from plate straps such as those 16 and 17, the plate straps 16 and 17 having been already connected to the plates 15, by any suitable means, such as that described in U.S. Pat. No. 3,395,748, or by any other means.

The cells 13 and 14 are separated by suitable cell partitions 18, constructed of an inert material, such as plastic or rubber (due to the presence of battery acid within the cells 13, 14, etc.). The partition 18 extends vertically upwardly between posts 20 and 21 of adjacent cells 14 and 13, respectively, with the partition 18 terminating at its upper end short of the upper ends of the posts 20 and 21, leaving a space 22 therebetween.

Figures 4, 5A:
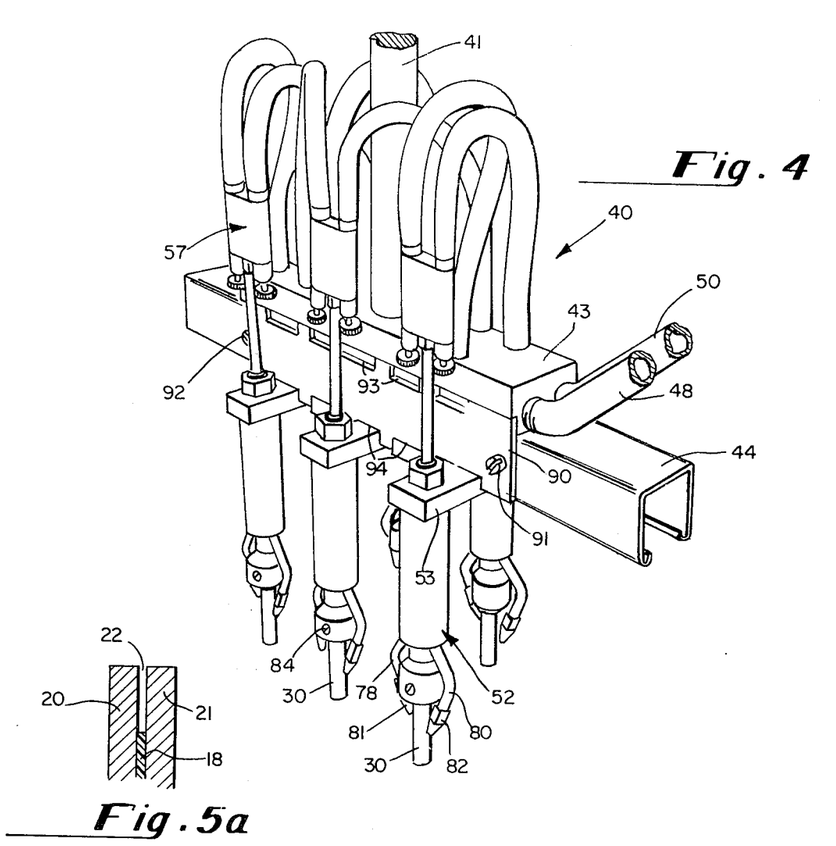
FIG. 4 is a perspective view of some of the welding apparatus illustrated in FIG. 1.
FIG. 5a is a fragmentary view of a pair of upstanding battery posts with a cell partition between adjacent battery cells being disposed therebetween.

It is this space 22 that, upon welding by the use of open flame being applied to posts 20 and 21, may become filled with molten or liquid lead (or other post material) from the upper ends of the posts 20 and 21, and flow downwardly to solidify in the space 22 just above the separator plate 18, without application of a proper amount of heat to those portions of the posts 20 and 21, below the upper ends thereof as illustrated in FIG. 5a, in the vicinity of the upper end of the cell partition 18.

A templet 23, constructed of some material (preferably metal) having a melting point substantially in excess of that of the material of the posts 20 and 21, is provided, on the battery, at the upper ends thereof, as illustrated in FIG. 1, with pairs of posts 20 and 21 extending upwardly through voids 24 therein. It will be clear that the voids 24 extend entirely through the templet 23, and that the voids 24 comprise central portions 25 of a desired size and configuration corresponding to the posts, to easily receive and contain the same.

The upper and lower ends of the voids 24 are countersunk as at 26 and 27, to permit reception of posts 20 and 21 through the lower ends 27 of the voids 24, and to provide a dished portion 26 at the upper end of each void 24, to accommodate the reception of molten metal during the welding operation, with the lower countersink or cut-away portion 27 also facilitating the removal of the templet 23 after the welding operation is complete, with the weldments solidified. It will further be noted that the templet 23 is received on the upper lip of the casing 28 of the battery 10, as illustrated in FIG. 1.

Figure 5B:
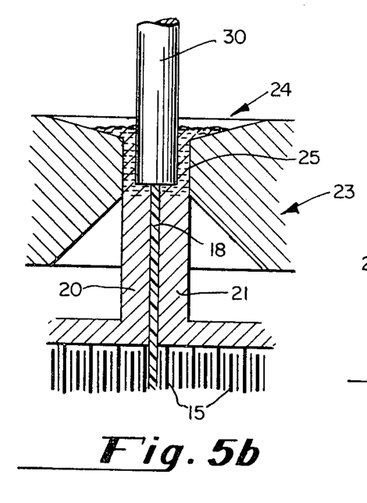
FIG. 5b is a fragmentary view of the pair of adjacent battery posts of FIG. 5a, with a templet disposed thereover, and with a welding element received within the templet, at the lower end of its stroke of penetration of liquified post portions.
Figure 5C:
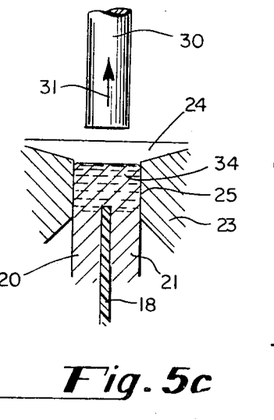
FIG. 5c is a fragmentary view of portions of the illustration of FIG. 5b, at a later stage, after withdrawal of a welding element from the void in the templet in which the liquid mass will be molded into solid form.

With particular reference to FIGS. 5a, 5b and 5c, it will be seen that a heated element 30 that has been heated by means later to be described herein, to a temperature sufficient to melt the upper ends of posts 20 and 21 of adjacent battery cells, across the top of a partition 18, is lowered into engagement with the upper ends of the posts 20 and 21, and proceeds to melt the same, into a liquid state, and then to continue its downward movement, penetrating the liquid portions of the post members 20 and 21 being progressively melted as the element 30 moves downwardly, throughout a predetermined vertically downward stroke of movement of the element 30, such stroke also including a dwell time at the lower end thereof, as illustrated in FIG. 5b, if desired (but such dwell not being required), followed by retraction, or vertically upward movement of the element 30, in the direction of the arrow 31 illustrated in FIG. 5c, whereby the mass of liquid melt displaced into the zone 26 of the templet 23 during that portion of the operation illustrated in FIG. 5b, is free to fill the zone 25 of the void 24 of the templet 23, above the upper end of the partition 18, as illustrated in FIG. 5c, for cooling and solidification of the melt in the zone 25. It will be noted that a plurality (five in number) of such elements 30 may be utilized simultaneously, in order to simultaneously effect five different welds, between posts of adjacent battery cells, or in fact any desired number of such weldments may be effected, for battery cells, or for any other purpose, by the above-mentioned method of maintaining a constant temperature for the element 30 and delivering such temperature completely throughout the zone of the posts 20 and 21, or other members, in which the weldment is desired.

Furthermore, it will be noted that the voids 24, and particularly the central portions 25 thereof, comprise molds for the welds, during solidification and cooling thereof. After the welds are solidified, the templet 23 may be removed from the casing 28 of the battery 10, for reuse, as desired.

Figure 5D:
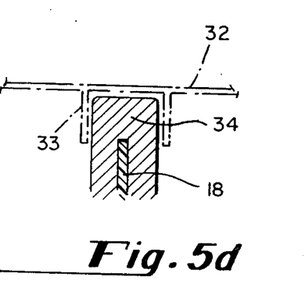
FIG. 5d is a fragmentary transverse view of a completed weld of battery posts of adjacent cells, welded across a partition, and with a battery cover being fragmentally illustrated in phantom disposed thereover, in order to best illustrate the manner in which a cover may accurately fit over an accurate and uniform battery post welded in accordance with this invention.

With particular reference to FIG. 5d, it will be apparent that a battery cover 32, having an annular cylindrical protrusion 33, for each pair of battery posts welded together, may be disposed over the upper end of the battery, with each weld 34 being received within a corresponding annular protrusion 33, for purpose of aligning the battery cover 32, if desired, and for facilitating the covering of the welds 34 and retention of the cover 32 on the battery 10.

It will further be noted that the welds 34 are simultaneously effected, for a given battery, and are all uniform, as regards their electrical qualities, and as regards their general height and other physical characteristics. Particularly as regards the height of the same, it will be noted that, all being of the same general height, the battery cover 32 will more easily fit therethrough, with posts having welds 34 at the upper ends thereof, all being uniformly received in uniformly sized annular protrusions 33 of the covers 32.

Referring now to the welding apparatus of this invention specifically illustrated in FIGS. 1 through 4, it will be seen that an apparatus 40 is presented, for carrying a plurality of heating elements or heat sinks 30 protruding outwardly (downwardly) from the lower end thereof.

Figure 2:
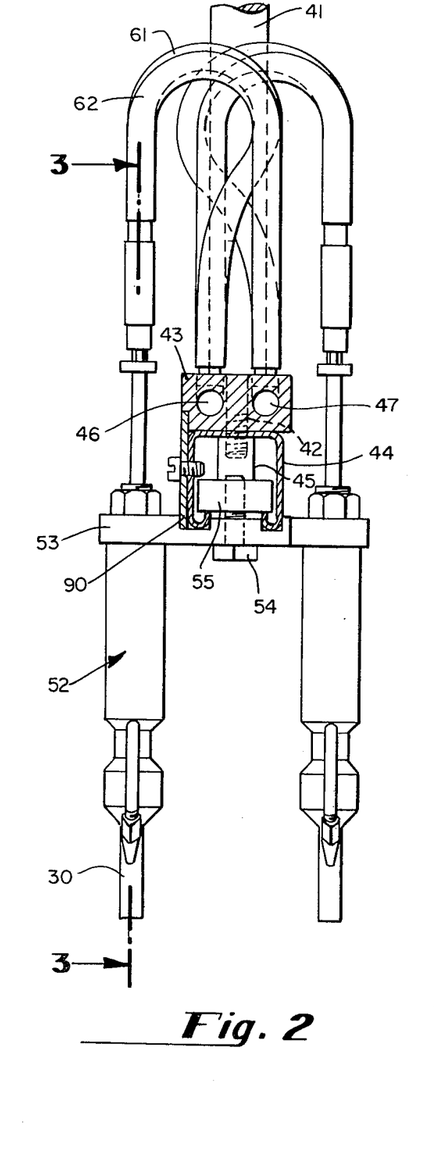
FIG. 2 is an enlarged fragmentary transverse view, of a portion of the apparatus illustrated in FIG. 1, taken generally along the line 2—2 of FIG. 1.
Figure 3:
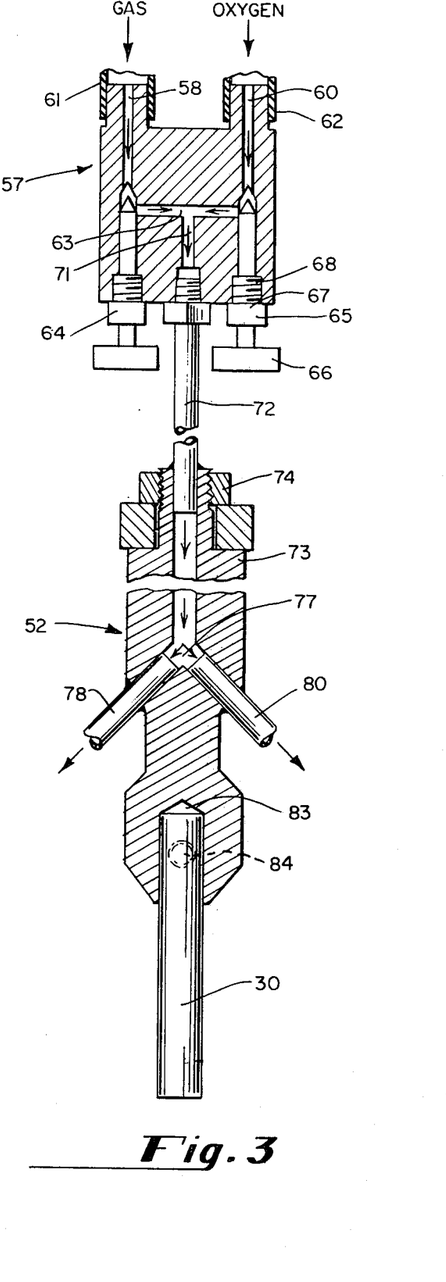
FIG. 3 is a further enlarged fragmentary sectional view, taken through one of the heat-applying devices of this invention, taken generally along the line 3—3 of FIG. 2.

The apparatus 40 comprises a post 41 of cylindrical configuration, connected by any suitable means, such as threading or the like, as at 42, through a manifold head 43, and through a base member 44, to be secured by means of a nut 45 therebeneath. The base member 44 is of channel-like construction, being generally of inverted U-shape in transverse cross-sectional configuration, as best illustrated in FIGS. 2 and 4. The manifold head 43 is secured to the upper end of the base 44, by any suitable means, such as screws or the like. The manifold head 43 is provided with a pair of conduits 46 and 47 extending longitudinally therethrough, each connected at one end to an associated gas distribution conduit 48 or 50, provided with associated on-off inlet valves 51, as desired. The conduits 48 and 50 are connected to suitable sources of gases, such as natural gas and oxygen, respectively, or any other gases that will facilitate and support combustion at the desired temperatures. Thus, acetylene gas may replace the natural gas if desired, as may a mixture of other gases, such as air, replace the oxygen, if desired.

The left-most end of each of the manifold channels 46 and 47 is closed, as blind conduits (not illustrated).

Five element heating means, generally designated each by the numeral 52 are provided, each of substantially identical construction, so that only one need be described in detail, and each of which is carried at the lower end of the base member 44, by a suitable horizontal plate 53, secured by means of a cap headed screw 54 or the like extending therethrough, in engagement within a nut 55 disposed within the base 44. Thus, the position of any given element heating means 52 may be altered by loosening the screw 54, and repositioning such desired element heating means by moving the plate 53 longitudinally of the base member 44.

Each of the heating means 52 is constructed as an independent torch, being provided at its upper end with a mixing device 57, having upper inlets 58 and 60 for receiving for example gas and oxygen therein from respectively associated hoses 61 and 62 that, in turn are respectively connected to associated manifold ducts 46 and 47, for supplying gas and oxygen to a chamber 63 disposed within the device 57, in which they are mixed.

Accordingly, the inlets 58 and 60 communicate respectively with the chamber 63. A pair of needle adjustments 64 and 65 are provided, associated with respective inlets 58 and 60, each comprising a thumb screw or the like 66, operative through a boss 67 in threaded engagement with the device 57 at 68, for adjusting the position of a needle 70 in the associated inlet, for regulating the amount of gas to be mixed with oxygen, and the converse. Upon arriving at a desirable gas-oxygen mixture, the mixture passes through the conduit 71, to discharge from the device 57, through a distribution line 72, that in turn is connected to an element holder 73, by suitable nuts 74 or the like in threaded engagement with threads 75, wherein the delivery line 76 is bifurcated at 77, into a pair of delivery lines 78 and 80 that are inwardly bent at the lower ends, and have nozzles 81 and 82 respectively carried thereby, in the vicinity of the upper ends of the elements 30, for heating the elements at a location spaced above the lowermost, or free ends thereof. The elements 30 are contained within bores or recesses 83, by suitable screws 84, for ease of replacement.

Thus, the application of open flame due to the elimination of gas and oxygen from nozzles 81 and 82, to the elements 30, will heat the elements 30 as aforesaid. It will be noted that elements 30 may also be heated by induction heating (not illustrated), or by other suitable means, if desired. In any event, heat is built up and stored in the element 30, and in order to facilitate this end the element 30 may be constructed of a high temperature alloy, ceramic, or any other suitable material. It will be noted that the flame may continually be applied to the element 30 during the descent thereof and its retraction, as illustrated in FIGS. 5b and 5c, throughout its engagement with and projection into the material of the battery posts 20 and 21, if desired, or the heat may be applied to the elements 30 only when the same are in their uppermost or retracted positions, as desired. In any event, there will be a transfer of heat from the elements 30 to the upper ends of the battery posts 20 and 21, that will be constantly replenished by the application of heat to the elements 30, by virtue of the application of open flame thereto as described above, or by induction heating, or the like. Furthermore, it will be noted that the heating elements or tips 30 may take on various desired physical configurations and sizes, depending upon the particular application.

Another feature of this invention resides in the use of a plate 90 secured to the member 44, by a pair of screws such as 91 and 92, for ease of removal of the same, with the plate 90 having a plurality of openings, voids, notches or the like, disposed in a uppermost set 93, and a lowermost set 94. The lowermost set 94 is arranged to accommodate plates 53, in accordance with a desired predetermined spacing of element 30 relative to each other, as measured horizontally, and relative to posts 20 and 21 of a battery 10 to be welded therebeneath, and also relative to the templet 23 mounted on the battery 10 and disposed therebeneath. Accordingly, placement of the plates 53, in desired ones of the notches 94, will readily accurately position the elements 30, in accordance with the desired position for welding the posts of a given battery, for example. However, the assembly illustrated in FIG. 4 may readily accommodate an alternative placement of the elements 30, by merely removing the plate 90, and inverting the same such that the notches 93 are disposed downwardly, whereby another placement of the element 30 relative to each other may readily be effected quickly and economically, with minimum set-up time.

With particular reference to FIG. 1, it will be noted that the rod 41 is either mounted to, or comprises, the piston rod of a piston (not shown), disposed within a piston cylinder 96, mounted on a suitable frame 97. The cylinder 96 is provided with suitable fluid inlets 98 and 100, respectively for providing a downward driving force, for lowering the elements 30, or for retracting the same, depending upon the position of the two way valve 101. It will be noted that the fluid supplied through the lines 98 and 100 may be any desirable hydraulic, pneumatic fluid or the like, and that the piston within the cylinder 96 would be driven either upwardly or downwardly, depending upon the setting of the valve 101.

It will be noted that the stroke of the piston contained within the cylinder 96 is controlled to automatically re-set the valve, upon the piston disposed therein reaching the lower end of a predetermined stroke, in order that the elements 30 may be retracted prior to striking the separator plates or partitions 18. However, in the event of misalignment of elements 30 relative to posts 20, 21, or relative to the templet 23, or relative to anything else wherein it is desired to prevent a striking of the same by the element 30, or even in the event that a battery 10 is raised, for example at one end, due to the presence of a foreign item between the lower end of the battery and the conveyor rollers 12, such that the battery is "cocked", upon the striking of the elements 30 against any solid member, a sensor of pressure, force or the like 102, which is particularly responsive to pressure required to lower the piston contained within the cylinder 96, and consequently responsive to resistance to vertical downward movement that the elements 30 may meet, will be operative to actuate the valve 101, to cause an upward movement, or retraction of the assembly 40, and consequently of the elements 30 carried thereby, in order to prevent damage to the apparatus, or to batteries being welded.

Also, with reference to FIG. 1, it will be noted that the rod 41 is provided with a guide, comprising a plate 103 having a boss 104 disposed about the rod 41, and carried by the plate 103, and with a guide rod 109 being provided, mounted in a suitable bushing 105 carried by a plate 106, such that, upon downward movement of the rod 41, the same is guided against undesirable lateral movement, due to the presence of the guide plate and rod 103 and 109.

It will thus be seen that the apparatus of this invention is adapted toward accomplishing its desired ends, both in broad respects, and in specific respects, regarding the construction of multiple-cell lead-acid storage batteries.

It will further be noted that the particular inwardly bent orientations of the nozzles 81 and 82, present the application of heat to adjacent areas, thereby concentrating the heat on the elements 30 themselves. It will also be noted that the element 30 may be adjustably positioned vertically within the blind hole 83, by merely loosening the screw 34 and repositioning the element 30. Furthermore, in operation, a proper positioning of the battery can actuate a switch (not shown), that in turn will cause the piston within the cylinder 96 to be actuated, if desired.

In view of the above-discussed invention, it has been possible to cut down the time necessary for completing a weld from thirty seconds to four seconds. Accordingly, aside from accomplishing improved welds, both insofar as their physical appearance and construction is concerned, and insofar as improving the uniformity and electrical conductivity of the same is enabled, the overall economics of battery manufacture is greatly improved, due to the automation of what has previously been a manual function.

An additional advantage over prior techniques of battery post weldment is also made possible with weldments of this invention. Such resides in the formation of a homogeneous weldment of adjacent battery posts. Spectrographic analysis of battery posts welded by conventional application of gas and oxygen flame directly to the post results in a tendency toward concentration of antimony from the posts at or near the bond of the weld, apparently caused by more severe heat at such locations relative to less heat applied to other areas of the weld. In thermal relay welding as taught by the instant invention, spectrographic analysis will reveal similar grain structures throughout the weld, in that the entire post area is heated uniformly and therefore cools evenly, without causing an antimony precipitation that would result in an antimony concentration. Consequently, the possibility of electrolysis at the antimony interface that forms the junction of dissimilar metals upon use of the battery in an electrical circuit is avoided by this invention, along with any corrosion attendant thereto. Furthermore, the structural strength of the post weldment is better, because of the absence of substantial discontinuities that would be formed by such antimony precipitation.

The foregoing discussion has emphasized the structure of the heating elements and the apparatus whereby combustible gases are delivered for the heating thereof. FIGS. 6 through 9 show an alternate illustrative embodiment wherein the heating elements are integrated with the templets lowered over the battery to form molds for the foregoing heating and melting process of the terminal posts. Moreover, the embodiment of FIGS. 6 through 9 features the heating elements and the molds in an integral adjustable configuration such that batteries having widely disparate structural characteristics may be processed efficiently without requiring extensive overhaul of the processing mechanism.

In the following description, many elements are identical both in structure and in function to corresponding elements in the foregoing discussion. Many of these are numbered similarly to the identical corresponding element, but further including a prefixed "7". Thus, for example, heating elements 730 in FIGS. 6 and 7 correspond identically to the heating elements 30 in FIGS. 1 through 5d. Unless otherwise specified, these identical elements shall not be discussed in detail, but shall be assumed to be disclosed completely in the foregoing.

Figures 6, 7, 8, 9:
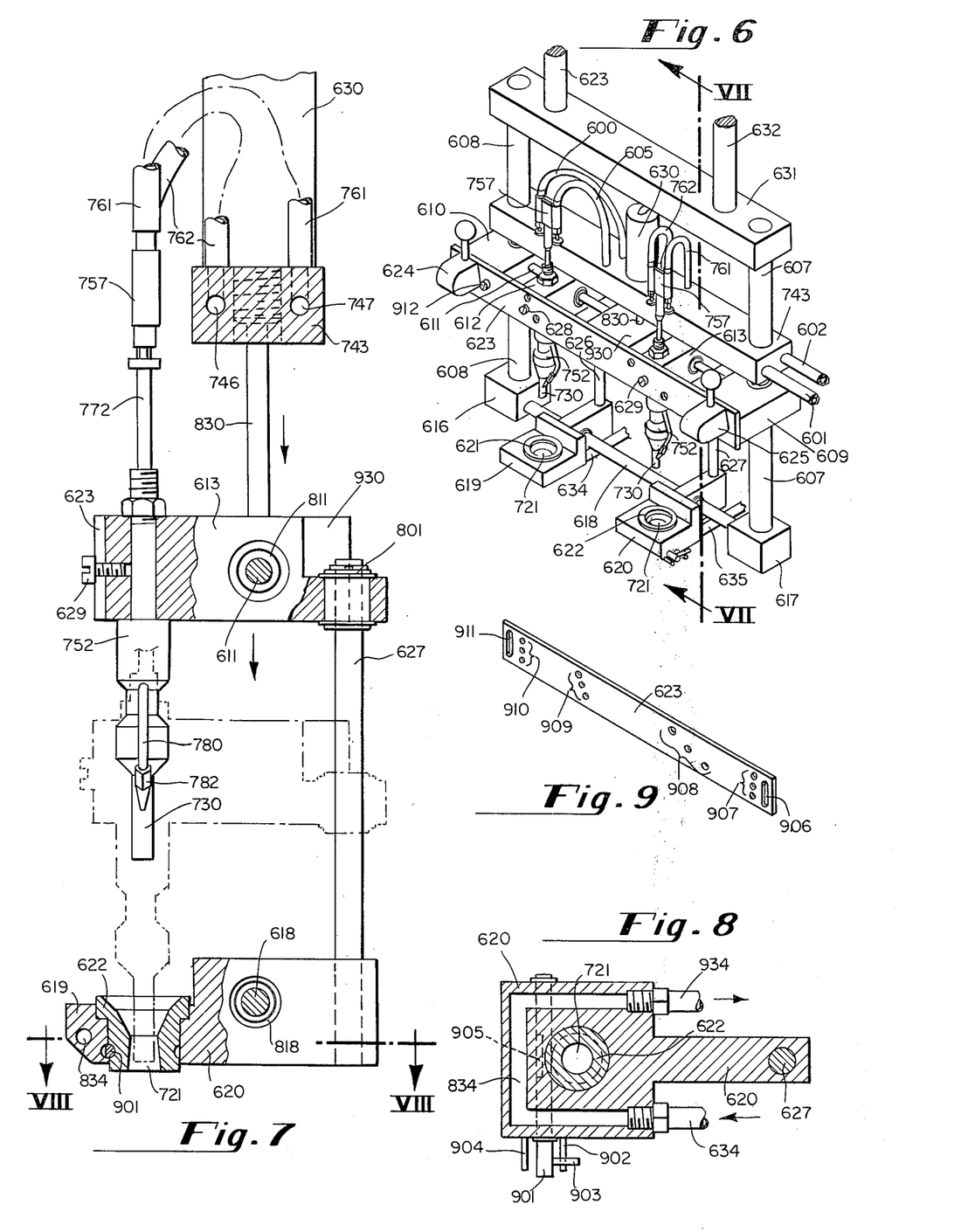
FIG. 6 shows an assembled view of an alternate illustrative embodiment of the principles of the present invention which features flexibly adjustable locations for the heating elements and also a flexible templet system.
FIG. 7 shows a cutaway of a portion of the FIG. 6 apparatus.
FIG. 8 shows in cutaway a variable position templet embodying the principles of the present invention.
FIG. 9 shows an overlaying plate to regulate the position of the heating elements, as desired.

In FIG. 6, a welding mechanism is set up for forming two terminal posts for batteries. Thus, while the foregoing embodiment included six welding mechanisms for cell to cell relays in batteries, the embodiment of FIGS. 6 through 9 is configured only to form the positive and negative terminal posts. It is to be understood, however, that any desired number of heating elements might be included in order to fulfill the desired welding requirements for given batteries. Likewise, the embodiment of FIG. 6 through 9 includes several features which enhance the adaptability and therefore the utility of thermal welding apparatus embodying the principles of the present invention.

In the figures, a pair of heating elements represented generally as 752 are affixed to a pair of mounting blocks 612 and 613, which in turn are slidably mounted on a transverse rod 611. This transversely movable mounting permits lateral adjustment of the heating elements 752 to accomodate batteries having terminal posts located at different points. The transverse rod 611 upon which the blocks 612 and 613 are mounted is terminated at either end by a pair of elements 609 and 610. Overlaying both of the mounting blocks 612 and 613 and affixed to the elements 609 and 610 is a plate 623 which affords control of the adjustability function and which shall be described in more detail hereinafter. Also mounted on the rod 611 is a fixed block 930 which is in turn connected to the piston 830 of a pneumatic or hydraulic cylinder 630. Together, the blocks 609, 610, 612, 613 and 930, with the rod 611 and the plate 623, form a "carriage" to which the heating elements 752 are attached, by means of which the heating elements may be moved vertically (such as shown in phantom in FIG. 7) and upon which the respective heating elements may be adjusted transversely.

The terminating blocks 609 and 610 of the carriage upon which the heating elements 752 are mounted are in turn slidably mounted on posts 607 and 608, respectively, by means of bearings, not shown. Thus, under the control of the cylinder 630 and piston 830, the carriage arrangement including the heating elements 752 is moved vertically on the posts 607 and 608 which are connected at their tops and bottoms, as shown, to elements 616, 617 and 631. Topmost element 631 in turn is mounted on posts 632 and 633, which constitute part of a structural frame for the mechanism.

Also fixedly mounted on the posts 607 and 608 is a manifold head 743 which defines conduits 746 and 747 fed by lines 601 and 602 with a combustible gas for flame heating of the heating elements 730. As in the foregoing embodiments, the gases pass through the conduits 746 and 747, through hoses 761 and 762 and into mixing devices 757, and thence downwardly into the heating means 752. As shown, only two sets of hoses connect the heating means 752 with the manifold head 743, but it is clear that any number, as desired, might similarly be connected. Also mounted on the manifold heads 743 is the cylinder 630 whereby the mounting carriage for the heating means 752 is movable.

An aspect of the embodiment of FIGS. 6 through 9 which exhibits substantial operational efficiency but which was not shown in detail in the foregoing embodiments is the inclusion of a pair of molds 619 and 620 which respectively are connected to the mounting blocks 612 and 613 for the heating means 752. The molds 619 and 620 are slidably mounted on a transverse post 618 through bearings such as 818 and are respectively mounted on shafts 626 and 627 which are slidably movable through the blocks 612 and 613. It may therefore be seen that the molds 619 and 620 are movable as a unit with the upper mounting carriage for the heating means 752 but furthermore are separately movable together by means of the sliding of shafts 626 and 627 through the mounting blocks 612 and 613.

The molds 619 and 620 are advantageously constructed to provide superior operational efficiency, which in turn is enhanced by their adaptability to process batteries of variable size. This may be appreciated by consideration of the various cutaway views in FIGS. 7 and 8. The principal structural member of the molds 619 includes a hollow channel 834 which is fed and exhausted by a pair of lines 634 and 934. The channel 834 provides a circulation route for water or other similar cooling fluids to be passed through, and thereby to prevent damage due to the extreme amounts of heat applied by the heating elements 730 to make the molten terminal posts. Centrally located on the flat portion of the structural housing 619 is a mold member 621 which mates with the structural housing and which actually forms the voids in which the melting and casting process takes place. The mold members 621 and 622 fit into a hole through the structures 619 and 620 and are locked therein by means of a slotted key 901 which locks the mold member 621 in place when situated as shown in FIGS. 7 and 8, but which allows for removal of member 621 when rotated 180° because the slot 905 then clears the outer periphery of the member 621. Lever arm 903 on the key 901 limits the rotary motion of the key by cooperating with extension members 902 and 904.

The mold members 621 and 622 are configured as shown to define voids 721 having an upper portion which is countersunk. Thus, when the heating member 730 is lowered as shown in phantom in FIG. 7 to heat and melt the terminal posts as shown in FIGS. 10a through 10d the level of the molten metal rises up into the countersunk portion, but when the heating element 730 is removed, the level settles back into the lower portion of the void 721 to dry in the standard configuration of a terminal post. In accordance with standardized procedures, positive and negative terminals of batteries are of different dimension in order to facilitate proper connection with external apparatus. In order to accommodate the wishes of various customers, the mold members 621 and 622 may have diffferent sized voids 721, and may be re-arranged between the molds 619 and 620 as desired. Moreover, the molds 621 and 622 shown may be freely interchanged with other similar members of different inner-configuration to process battery elements of varying size and configuration, as desired.

FIG. 9 shows a view of the overlying plate 623 which is affixed in the carriage assembly to end blocks 609 and 610 by means of cam means 624 and 625, and which, when so situated, determines the lateral position of the heating means 752. More particularly, the securement means 624 and 625 fit through slots 906 and 911 in the plate 623 and screw or bolt into the terminating blocks 609 and 610. The face of the plate defines first and second sets of openings 907 and 910, and a plurality of sets of openings such as 908 and 909 extending across the face of the plate. Once the securement members 624 and 625 mount the plate onto the carriage assembly, set screws such as 912 through select ones of the end holes 907 and 910 establish the vertical location of the plate 623. Thereupon, a position is established for the support blocks 612 and 613 because they are affixed to the plate 623 by screws 628 and 629 through appropriate ones of the holes 908 and 909. Thus, use of particular ones of the holes 907 and 910 establish which the holes 908 and 909 (or any other such sets of holes, as desired) to which the blocks 612 and 613 shall be mounted. It is to be understood that by alteration of the holes such as 908 and 909, any desired position of the heating means 752 on the shaft 611 may be established. Since the molding apparatus 619 and 620 is affixed to the respective blocks by means of posts 626 and 627, similar positioning is established for the molding apparatus 619 and 620 on the lower shaft 618. Likewise, in order to accomodate different numbers of heating means 752, it would only be required to establish correspondingly more sets of holes in the plate 623.

Figures 10A, 10B:
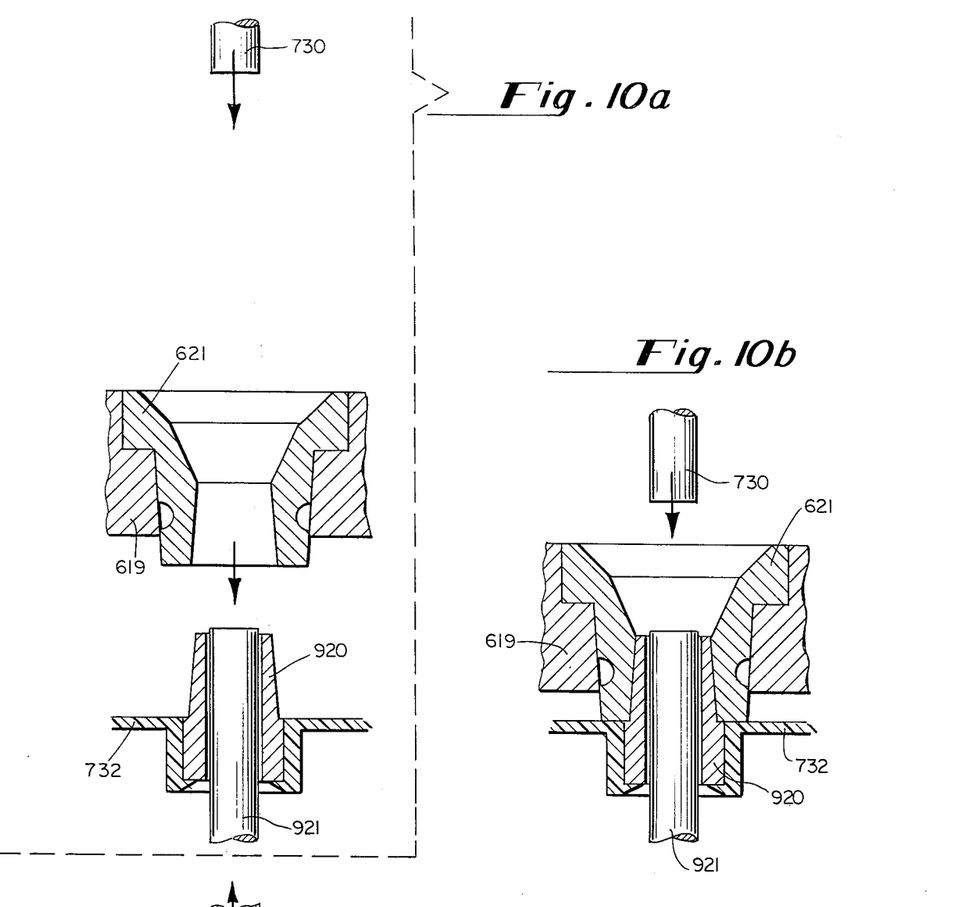
FIGS. 10a through 10d show the operation of the apparatus of FIGS. 6 through 9 to secure terminal posts to bushings therefor.
Figure 10C:
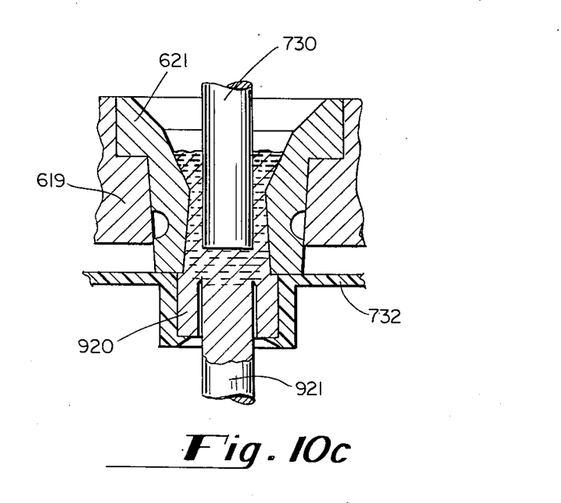
Figure 10D:
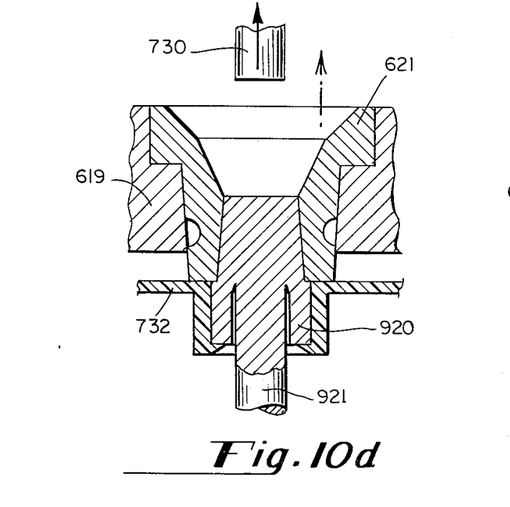

In a preferred mode of operation, the embodiment in FIGS. 6 through 9 operates as shown in FIGS. 10a through 10d. In FIGS. 10a through 10d, a bushing 920 is mounted around the post hole of the battery casing 732 as is practiced in the art. Thereupon, as the casing is assembled, a terminal post 921 fits into the metallic bushing, to be welded thereto by application of apparatus embodying the principles of the present invention. In order to prepare the machinery of FIGS. 6 through 9 for operation, the plate 623 first is adjusted as desired to locate the heating means and the molding means appropriately over batteries to be processed. Once a battery is positioned beneath the FIG. 6 apparatus by means of a conveyor or the like, not shown, the cylinder 630 and piston 830 are energized to lower the carriage assembly and the molding apparatus downwardly onto the battery as shown in FIG. 10a. The first portion to make contact with the battery includes the molding means, which seat as appropriate over the portion to be processed as shown in FIG. 10b. Thereupon, however, the cylinder 630 and piston 830 continues to exert downward force upon the carriage assembly, as shown in FIG. 10b, and a sliding of the carriage over the downward shafts 607, 608, 626, and 627 results, such as shown in phantom in FIG. 7. Once the heating means 752 are lowered to the desired position, as shown in FIG. 10c, the melting process of bushing 920 and post 921 as described hereinbefore is conducted, after which the heating means 752 first are withdrawn and sufficient time is allowed for the molten terminal post to set, as shown in FIG. 10d, and the entire assembly is then withdrawn upwardly.

It may therefore be seen that the principles of the present invention provide substantial flexibility, in that variable numbers of heating means 752 may be utilized, but all are freely adjustable in accordance with the established structure of the plate 623. By utilizing associated molding mechanisms, further adaptability is provided, since, first, unitary mold mechanisms are not needed, and, secondly, the interchangeable mold members 621 and 622 facilitate processes of different types.

It will also be noted that, while the invention is described and illustrated above, it is principally for use with multiple-terminal applications, the same may be used for single applications, regarding the welding of batteries, and with respect to other types of welding. Furthermore, various changes in the details, materials and arrangement of parts, as well as in the use and operation thereof may be effected, all within the spirit and scope of the invention as recited in the appended claims.

I claim:

1. An apparatus for thermal welding of a plurality of members together comprising: heating element means comprising at least one element that is heated and directly applied to members to be welded together and means for heating said element; a templet having a void therein for receiving members to be welded together, said void being configured to define molding means for molding molten metal of the members to a desired configuration; and means engaging said heating element means and said templet for providing controlled predetermined relative positioning and relative movement therebetween, having means to move said templet to a position wherein it receives said members for welding, and thereafter to move said heating element means toward said templet and into engagement with the members to be welded, said engagement continuing until the element penetrates a portion of said members in their molten state, and thereafter to withdraw said element relative to molten portions of said members, and thereafter remove said templet from said members.

2. The invention of claim 1 wherein said means engaging said heating element means and said templet provides the additional function of permitting the solidification of said molten portions to be effected within said molding means prior to removing said templet.

3. The invention of claim 1 wherein there are a plurality of said heating element means and a plurality of said templets repaired therewith and engaged to function as aforesaid; and means are provided engaging said pairs for relative adjustment of the position of said pairs with respect to one another in a direction other than the direction of movement aforesaid.

4. The invention of claim 1 wherein a mounting block is fixedly connected to said heating element means and is fixedly connected to the means for providing movement between the heating element means and the members to be welded; and the templet is fixedly connected to one end of a shaft which is slidably movable through said block to a predetermined limit remote from said block.

5. The invention of claim 4 wherein there are a plurality of said heating element means, block, templet, and shaft combinations for relative movement as aforesaid positioned laterally with respect to said shafts and in engagement with one another; and means are provided for adjustable lateral relative positioning of said combinations.

6. The invention of claim 5 wherein said last mentioned means comprises a plate having a plurality of openings therein and fastening means for attaching at least a portion of each of said combinations to said plate through said openings.

7. The invention of claim 3 wherein each of said templets comprises a housing defining an opening therethrough and a removable mold member matably mounted in said opening, said mold member defining a space for enclosing said members to be welded.

8. A templet as described in claim 7 and further including a slotted key for holding said mold in said housing, said housing defining a keyway for said key in the proximity of said mold.

9. A templet as described in claim 7 wherein said housing defines a channel therein for passage of a coolant fluid.

10. Apparatus for thermal welding a plurality of members together comprising: at least one element adapted to be heated and directly applied to members to be welded together; means integral with said element for applying heat to said element; means for moving said element into engagement with the members to be welded, said engagement continuing until the element penetrates a portion of said members in their molten state, and for withdrawal of said element relative to molten portions of said members whereby the solidification of such molten portions may be effected; and further including at least one templet; said templet having five horizontally spaced voids for receiving members to be welded together, corresponding to five horizontally spaced respectively associated said elements, with each of said voids being adapted to receive members to be welded therein and with corresponding elements being carried by said apparatus for said movement into substantially simultaneous engagement relative to respectively associated members; each of said voids being configured to define molding means for molding molten metal of the members to a desired configuration; with said elements being vertically aligned for vertical downward movement toward said voids; and including means for providing controlled predetermined vertical downward and upward movement of said elements toward and away from said voids; and further including a separator means disposed in vertical alignment with said elements between members to be welded together, and force responsive means for reversing the downward direction of movement of the elements in response to engagement of a said element with a said separator means during vertical downward movement of said elements.

11. Apparatus for thermal welding a plurality of members together comprising: at least one element adapted to be heated and directly applied to members to be welded together; means integral with said element for applying heat to said element; means for moving said element into engagement with the members to be welded, said engagement continuing until the element penetrates a portion of said members in their molten state, and for withdrawal of said element relative to molten portions of said members whereby the solidification of such molten portions may be effected; templet means integrally connected with said element, said templet means having a void therein for receiving the corresponding element and for molding molten metal formed by said heating element from members to be welded; said templet means including a post slidably mounted to said heating element, whereby movement of said element by said means for moving first causes said templet to engage members to be welded, after which said post directs the corresponding element to engage the members to be welded.

12. Apparatus as described in claim 11 wherein said heating element is affixed to a separate mounting member slidably disposed on a lateral rod, whereby said apparatus may be adjusted to accommodate various members to be welded.

13. Apparatus as described in claim 12 wherein said templet means is slidably mounted on a traverse rod, whereby said templet means is precisely laterally adjustable with its corresponding heating element.

14. Apparatus as described in claim 12 wherein said heating element and said templet means are located above members to be heated, said apparatus further including hydraulic piston means for lowering said templet means and said heating element successively into engagement with members to be heated.

15. Apparatus for thermal welding a plurality of members comprising:
a structural support means;
an assembly vertically slidably mounted on said support means and including first and second horizontal rod means, said second rod means being below and further vertically slidably mounted on said first rod means;
a plurality of heating means slidably mounted on said assembly, each heating means having an upper portion slidably mounted on said first rod means and a lower portion slidably mounted on said second rod means;
each of said upper portions including a heated element, means for flame heating said element, and means connecting said element to said first rod means;
each of said lower portions including a housing slidably mounted on said second rod means and having a void therein and an upwardly depending rod portion slidably penetrating a connecting means of the corresponding upper portion;
a plurality of mold means interchangeably mounted in said voids, each mold means defining oppositely facing outwardly tapering frustoconical segments for receiving molten metal from said members and for casting said molten metal; and motive means for lowering said assembly until said lower portions engage members to be welded, and then for further lowering said first rod means to engage said elements with members to be welded, and, when said members are melted, for withdrawing said first shaft means to permit casting of the melt, and then for withdrawing said assembly.

* * * * *